United States Patent
Hasegawa

(10) Patent No.: US 10,215,211 B2
(45) Date of Patent: Feb. 26, 2019

(54) DRIVABLE SCREW NAIL

(71) Applicant: FUJITOMI CORPORATION, Ikeda-shi, Osaka (JP)

(72) Inventor: Takeo Hasegawa, Ikeda (JP)

(73) Assignee: FUJITOMI CORPORATION, Osaka (JP)

( * ) Notice: Subject to any disclaimer, the term of this patent is extended or adjusted under 35 U.S.C. 154(b) by 0 days.

(21) Appl. No.: 15/538,505

(22) PCT Filed: Dec. 17, 2015

(86) PCT No.: PCT/JP2015/086154
§ 371 (c)(1),
(2) Date: Jun. 21, 2017

(87) PCT Pub. No.: WO2016/104664
PCT Pub. Date: Jun. 30, 2016

(65) Prior Publication Data
US 2018/0017092 A1  Jan. 18, 2018

(30) Foreign Application Priority Data
Dec. 24, 2014 (JP) ................... 2014-267286

(51) Int. Cl.
*F16B 15/00* (2006.01)
*F16B 15/02* (2006.01)
(Continued)

(52) U.S. Cl.
CPC .......... *F16B 15/02* (2013.01); *F16B 25/0063* (2013.01); *F16B 35/06* (2013.01);
(Continued)

(58) Field of Classification Search
CPC ................. F16B 15/02; F16B 35/065
(Continued)

(56) References Cited

U.S. PATENT DOCUMENTS

| 243,267 A | * | 6/1881 | Hyslop | ................. B21G 3/005 24/127 |
| 1,946,800 A | * | 2/1934 | MacLean | ............. F16B 33/004 411/399 |

(Continued)

FOREIGN PATENT DOCUMENTS

| JP | 47-36226 Y1 | 11/1972 |
| JP | 48-20831 Y1 | 6/1973 |

(Continued)

OTHER PUBLICATIONS

Official Communication issued in International Patent Application No. PCT/JP2015/086154, dated Feb. 9, 2016.

(Continued)

*Primary Examiner* — Flemming Saether
(74) *Attorney, Agent, or Firm* — Keating & Bennett, LLP

(57) ABSTRACT

An impact-driven threaded nail includes a threaded portion with a lead angle of about 45°, the threaded portion being defined along an outer circumference of a nail shank that includes a first end defined as a pointed tip; and a head having a larger diameter than the nail shank, the head being integrally provided at a second end of the nail shank, wherein a tapered portion of the head on a back-surface side in continuation with the nail shank is defined in a pyramidal shape having one of regular pentagonal to octagonal cross-sections with a diameter decreasing gradually toward the nail shank, and the threaded nail is configured to be impact-driven and rotate into a mounting member when impacted.

4 Claims, 2 Drawing Sheets

(51) Int. Cl.
*F16B 25/00* (2006.01)
*F16B 35/06* (2006.01)

(52) U.S. Cl.
CPC ............ *F16B 35/065* (2013.01); *F16B 15/00* (2013.01); *F16B 25/0015* (2013.01)

(58) Field of Classification Search
USPC ........................................ 411/439, 399, 923
See application file for complete search history.

(56) References Cited

U.S. PATENT DOCUMENTS

| | | | | |
|---|---|---|---|---|
| 2,558,379 | A * | 6/1951 | Phipard, Jr. ............. | F16B 15/06 29/432 |
| 3,977,142 | A * | 8/1976 | Dove ....................... | F16B 15/06 411/394 |
| 5,015,134 | A * | 5/1991 | Gotoh ................. | F16B 25/0015 411/386 |
| 6,302,631 | B1 * | 10/2001 | Takasaki ............... | F16B 35/065 411/399 |
| D572,122 | S * | 7/2008 | Cave .............................. | D8/373 |
| 2001/0028835 | A1 | 10/2001 | Oesterle et al. | |

FOREIGN PATENT DOCUMENTS

| | | |
|---|---|---|
| JP | 49-000653 A | 1/1974 |
| JP | 54-97668 U | 7/1979 |
| JP | 05-296219 A | 11/1993 |
| JP | 2000-510563 A | 8/2000 |
| JP | 2002-242913 A | 8/2002 |
| JP | 2006-071083 A | 3/2006 |
| JP | 2010-169253 A | 8/2010 |
| JP | 2011-043234 A | 3/2011 |
| WO | 2006/004084 A1 | 1/2006 |

OTHER PUBLICATIONS

Official Communication issued in International Patent Application No. PCT/JP2015/086154, dated May 16, 2017.
Official Communication issued in International Patent Application No. PCT/JP2015/086154, dated Feb. 21, 2017.

* cited by examiner

BOMBSHELL-LIKE SHAPE

B-B SECTIONAL VIEW

DRIVABLE SCREW NAIL

TECHNICAL FIELD

The present invention relates to an impact-driven threaded nail that is driven into various materials by being hit with a hammer or the like, and that is used, for example, to fix the materials to each other.

BACKGROUND ART

A nail constituted by forming a head at an end of a shank having a pointed tip at an opposite end of the shank, the nail being generally called a round nail, is widely used as means for fixing, for example, wood materials to each other. There are also used a nail including a helical thread, which is called a screw nail, and a nail including ring-shaped projections formed on a shank, which is called a ring nail. In addition, threaded nails screwed into materials by employing a tool, such as an electrical screwdriver, are further used in many cases.

The round nail is driven into a material by hitting a nail head with a hammer, for example. Because the tip is pointed, the material such as a wood material, for example, into which the round nail is driven, is elastically deformed by the action of a wedge, and the shank is forced to thrust into the inside of the material. Hence the shank is fixedly held by elasticity of the material while undergoing gripping pressure. The round nail can be comparatively easily driven into woods or the likes. However, attachment strength of the round nail is given only by frictional resistance force under the gripping pressure due to the elasticity of the material, and the round nail is held in the material by frictional force. Therefore, the round nail has the problem that holding force is not so large and is apt to loosen. Furthermore, when pulling out the round nail, a special nail puller has to be used, and the surface of the material to which the round nail has been attached may be damaged.

The so-called screw nail includes a pointed tip in the form of a quadrangular pyramid, and a shank having an outer circumference along which helical ridges and grooves are formed in multiple threads. By hitting a head of the screw nail with a hammer, the screw nail is forced to thrust into woods, for example, while the shank is caused to rotate. Because the helical ridges and grooves are formed along the outer circumference of the shank, resistance against force in a pulling-out direction is large, and high holding force is obtained.

The so-called ring nail includes a pointed tip in the form of a quadrangular pyramid, and a shank having an outer circumference on which ring-shaped projections or recesses are formed. When the ring nail is driven into a material, the material is pushed to spread outward by outer circumferential portions of the rings. After being driven, when the ring nail is subjected to a pulling-out action, the outer circumferential portions of the rings come into, due to a restoration phenomenon of the material such as a wood material, a state caught by the restoring wood, and holding force is generated. The holding force is larger than that obtained with the round nail, but it is not so large.

On the other hand, the screw nail provides larger holding force than the round nail because, when the screw nail is driven into a material, it is forced to thrust into the material while rotating about a shank axis, and is fixedly held by engagement between a screw and the material. However, the screw nail has the problems that the screw nail is slightly pulled back even with a low load, and that there is a difficulty in entirely pulling out the screw nail and removing the attached material.

The threaded nail driven into a material by employing an electrical screwdriver, for example, is generally called a coarse thread. The coarse thread is the so-called half-thread screw that includes a head having a cross (+)-shaped recess formed to allow screwing by the electrical screwdriver, and a shank in which a portion of the entire length of the threaded nail closer to the head remains in the form of an element shank without being threaded, and in which a single-thread screw with a lead angle of about 20° is formed over the remaining shank portion from the above portion up to a tip. Thus, that type of threaded nail is intended to obtain higher attachment strength than the round nail, the screw nail, and the ring nail when used to attach wood materials to each other (see FIG. 6).

In trying to attach an attached material, which is a wood material or the like, to an underlying material, which is also a wood material or the like, with the above-mentioned type of threaded nail by employing the electrical screwdriver, for example, at a time when the threaded nail is screwed into the attached material from its surface and a tip of the threaded nail is just going to be screwed into the underlying material after penetrating through the attached material, the nail tip does not immediately come into the underlying material while the threaded nail advances relative to the attached material with continued rotation. Thus, due to the so-called time lag, the threaded nail is screwed into the underlying material in a state that a gap is generated between the underlying material and the attached material. To cope with the above-mentioned problem, the coarse thread is formed as the so-called half-thread screw without forming the thread over the entire length of the shank up to the head. Accordingly, it can be said that, even though high holding force relative to the underlying material is obtained with the threaded portion, the threaded portion is not present in a region corresponding to the attached material, and the attachment strength of the attached material with respect to the underlying material, which has been attached with the above-mentioned type of threaded nail, is at a level obtained with holding only by the driven head of the threaded nail.

Aiming to solve the above-described problems with the related-art nails, the inventor has developed an impact-driven threaded nail that includes a threaded portion formed in a shank, and has gained Japanese Patent (see Patent Literature (PTL) 1 denoted below). The patented impact-driven threaded nail has succeeded in significantly solving the problems with the related-art nails.

CITATION LIST

Patent Literature

PTL 1: Japanese Patent No. 5458354

SUMMARY OF INVENTION

Technical Problem

The threaded nail disclosed in PTL 1 is easier to be driven into and pulled out from a material than the related-art nails, and provides larger attachment strength than the other types of nails because the threaded portion bites into the material. However, the inventor has found that, when the attached material is a thin sheet such as plywood, a slight gap is generated between the attached material and the underlying material upon application of external force even in the case of the external force being fairly small. The inventor has further found that, looking at the head of the threaded nail in such an event, the head is slightly rotated in a backward direction, i.e., a loosening direction of the threaded nail. The reason presumably resides in that the patented threaded nail has been developed as an impact-driven threaded nail, and that a lead angle of the thread is set to be fairly large, i.e., about 45°, in comparison with the lead angle of an ordinary screwing threaded nail such that the threaded portion can be screwed into the material while rotating with application of impact. Thus, when external force acts in a direction to pull back the attached material from the underlying material as mentioned above, a portion of the threaded nail, the portion being present within the underlying material, is subjected to force acting on the threaded nail to pull out it from the underlying material, and is caused to rotate in a direction opposite to that when the nail has been driven.

However, when the attached material is pulled back from the underlying material with application of external force as described above, a portion of the threaded nail, the portion being present within the attached material, is caused to rotate forward due to the presence of the thread in that portion. Thus, the portion of the threaded nail present within the underlying material and the portion of the threaded nail present within the attached material are caused to rotate in the opposite directions. In the ordinary case, there are no problems because the threaded nail is an integral member and rotational forces are cancelled out. However, when the thickness of the attached material is small as described above, the threaded nail is rotated in the loosening direction as a whole under an influence resulting from the fact that the rotation force exerted on the nail portion within the underlying material is larger than the rotational force exerted on the nail portion within the attached material. This brings the threaded nail into a state substantially similar to the state where the attached material is pulled back from the underlying material. As a result, a slight gap is generated between the underlying material and the attached material, and the so-called loosening occurs.

Accordingly, an object of the present invention is to provide means capable of giving a preventive effect of preventing an impact-driven threaded nail from being easily rotated in a direction opposed to that when the nail is driven, even with application of external force to between an underlying material and an attached material, the external force acting to cause the above-described loosening of the nail.

Solution to Problem

To achieve the above object, the present invention is constituted as follows. The present invention set forth in claim 1 provides an impact-driven threaded nail, similar to that disclosed in the above-cited PTL 1, including a threaded portion with a lead angle of about 45°, the threaded portion being formed along an outer circumference of a nail shank that has one end in the form of a pointed tip, and a head having a larger diameter than the nail shank, the head being integrally provided at the other end of the nail shank, wherein a tapered portion of the head on a back-surface side in continuation with the nail shank is formed in a pyramidal shape having a regular polygonal cross-section with a diameter decreasing gradually toward the nail shank. Preferably, the tapered portion has a regular hexagonal sectional shape.

Among screwing threaded nails that are screwed into materials with screwdrivers, for example, there is a nail including a head, often called a flexible head, provided with several ribs on a conical circumferential surface on the back-surface side (see FIG. 10). However, those ribs are intended to countersink the attached material with rotation such that the head surface of the screwing threaded nail is buried to such an extent as becoming flush with the surface of the attached material. In other words, that type of threaded nail is quite different in object and advantageous effect from the threaded nail according to the present invention in which the head shape is improved to prevent the loosening of the nail. Even if those ribs are provided on the impact-driven threaded nail with intent to obtain the loosening preventive effect, the loosening preventive effect would be hardly expected. Rather than the advantageous effect, an adverse influence, such as damage of the attached material, is unavoidable depending on the kind of the attached material.

In addition to the loosening preventive means, preferably, a groove engageable with a screwdriver for the purpose of pulling out the threaded nail is formed in an upper surface of the head. An outer circumferential portion of the head may be formed in a hexagonal shape allowing the head to be engaged with a spanner instead of or in addition to the groove for engagement with the screwdriver.

Furthermore, preferably, the upper surface of the nail head is chamfered (or rounded in some cases) to be relatively lowered at its outer circumferential portion in order to maximally allow smooth rotation of the threaded nail in a contact region between a hitting hammer and the upper surface of the nail head when hit by the hammer, and to make hitting force received at a central region of the head upper surface.

Moreover, in the impact-driven threaded nail according to the present invention, the lead angle is set to a fairly large value, i.e., about 45°, as described above while the lead angle of the screwing threaded nail is about 20°. Therefore, in trying to rotate and loosen the impact-driven threaded nail with, e.g., an electrical screwdriver to remove the attached material from the underlying material, larger torque needs to be applied corresponding to the larger lead angle. Moreover, when the attached material has a large thickness, the threaded nail having a large entire length has to be used. If the threaded nail is threaded over the entire length, even larger torque is needed in rotating and loosening the threaded nail to remove the attached material from the underlying material. In some cases, frictional resistance force generated in the threaded portion becomes excessively large, thus causing a problem that the so-called "thread breakage" may occur.

One conceivable solution to such a problem is to reduce the frictional resistance force by reducing the number of threads formed in the threaded portion. However, the number of threads is preferably as large as possible because the threaded nail according to the present invention is the impact-driven threaded nail and the hitting force is to be converted to rotating force of the threaded nail.

Another problem is that, in the case of strong external force acting on the underlying material and the attached material in the attached state to separate both the materials from each other, the threaded nail may be torn off at an external-force applied position because the threaded portion is present in both the underlying material and the attached material over such a region as generating tensile force in excess of the allowable tensile strength of the threaded nail in its cross-section corresponding to the external-force applied position.

Accordingly, when the entire length of the threaded nail is very long, regions where an element shank remains in a state without being threaded are preferably provided at multiple positions along the entire length so as to interrupt the threaded portion in the discrete form (as illustrated in FIG. 4) such that the generated shearing force does not exceed the strength necessary for attaching the threaded portion. The above configuration is also preferable in that the thread interrupted region can be utilized as a mounting space for a coupling member when a driving air gun is used to drive the threaded nail.

Advantageous Effects of Invention

With the impact-driven threaded nail according to the present invention, the tapered portion present on the back-surface side of the nail head in continuation with the nail shank is formed in the pyramidal shape having the regular polygonal cross-section with the diameter decreasing gradually toward the nail shank. Therefore, when the impact-driven threaded nail is driven into a material, regular polygonal surfaces of the nail head are subjected to contact surface pressure due to elastic deforming force generated in the material by making the pyramidal tapered portion buried into the material surface. In addition, when two attached materials undergo external force acting to separate those materials from each other, the regular polygonal surfaces of the nail head are subjected to higher contact surface pressure. As a result, the rotation preventive effect can be obtained.

DESCRIPTION OF EMBODIMENTS

Figure 1:
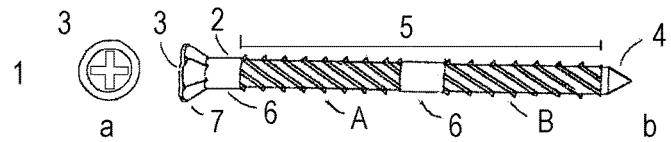
FIGS. 1(a) and 1(b) are respectively a plan view and a front view, each representing an impact-driven threaded nail according to a first embodiment of the present invention.

An embodiment of the present invention will be described in detail below. In an impact-driven threaded nail 1 illustrated in FIG. 1, a head 3 is integrally formed at one end of a shank 2, and the other end of the shank 2 is formed into a pointed tip 4. Details of Embodiment and EXAMPLE 1

A threaded portion 5 is formed along an outer circumference of the shank 2. In this embodiment, the threaded portion 5 is divided into upper and lower parts such that an unthreaded shank portion 6 having a circular columnar shape and being not threaded remains between both the parts. An upper threaded portion (on the head side) A has a lead angle of 42°, and a lower threaded portion (on the tip side) B has a larger lead angle, i.e., 45°.

Although the threaded portion is divided into the portions A and B, the upper threaded portion and the lower threaded portion are formed in the discrete form allowing the lead angles in those portions and a length of the unthreaded shank portion 6 to be adjusted such that, when the driving of the nail is progressed, the upper threaded portion is driven in a good matched relation to screwing tracks of the lower threaded portion. The reason why the lead angle of the tip-side threaded portion B is relatively large and the lead angle of the head-side threaded portion A is relatively small resides in causing the upper threaded portion to be closely engaged in the screwing tracks formed by the lower threaded portion, and in ensuring reliable fixing.

Figure 2:
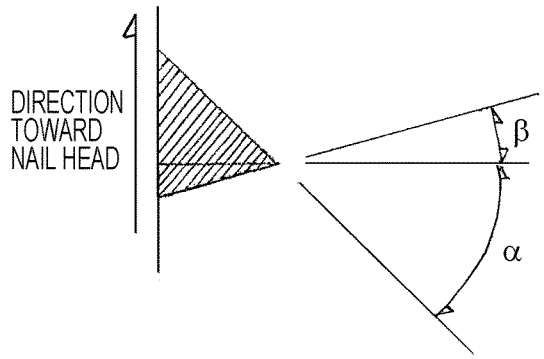
FIG. 2 is an enlarged view representing a thread shape.

The threaded portions A and B are each in the form of a quadruple-thread screw, and thread ridges have a shape as per illustrated in FIG. 2. In the upper threaded portion A, a lower-height thread ridge is formed at alternate thread of the quadruple-thread screw for volume adjustment. In the lower threaded portion B, however, all thread ridges have the same height. While tips of various types of ordinary nails have rectangular pyramidal shapes with apex angles of about 30°, the pointed tip of the impact-driven threaded nail has a conical shape with a fairly larger apex angle of 60°, for example, in order to not only promote rotation of the threaded nail, but also to prevent cracking of wood when the nail is driven.

The thread ridge is shaped, as illustrated in FIG. 2, such that an angle $\alpha$ of a sloping flank on the head side is 45° and an angle $\beta$ of a sloping flank on the tip side is 15°. The reason why the angle of the sloping flank of the thread ridge is set to be relatively small on the tip side and relatively large on the head side resides in ensuring that the impact-driven threaded nail more efficiently receives force in the rotating direction when the nail is driven, and that it can be more easily pulled out by receiving rotating force when the nail is pulled out.

Figure 3:
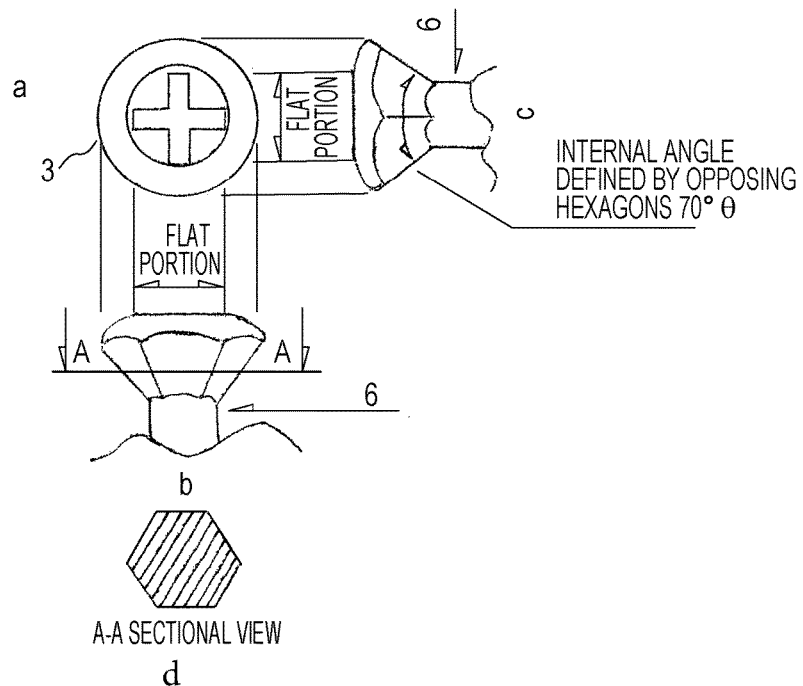
FIGS. 3(a), 3(b), 3(c) and 3(d) are respectively a plan view, a front view, a side view, and a sectional view of a head of the impact-driven threaded nail.

The head has a shape as per illustrated in FIG. 3. As seen from FIG. 3, a portion of the head on the back-surface side (i.e., the side nearer to the shank) is formed in a pyramidal shape having a regular hexagonal cross-section. An internal angle defining the pyramidal portion, denoted by a Greek letter in FIG. 3, is 70°. When the number of angles of the pyramidal portion is increased as represented by an octagon, for example, the pyramidal portion has a sectional shape closer to a circle and the rotation preventive effect is reduced. When the number of angles of the pyramidal portion is decreased as represented by a rectangle, the rotation preventive effect is reduced by half.

In the illustrated example, the head has a circular shape in a plan view, and a cross (+)-shaped groove is formed in an upper surface of the head. A screwdriver is to be engaged with the groove when the nail is pulled out. Depending on cases, the groove may have a hexagonal, rectangular, or minus (−)-like shape. The upper surface of the nail head is chamfered or rounded in some cases to be relatively lowered at its outer circumferential portion such that the hitting force is maximally concentrated to a central region.

In the illustrated example, the internal angle defining the pyramidal portion of the head, denoted by the Greek letter in FIG. 3, is 70° as mentioned above. Because of the head having an outer diameter that is to be held within a certain limited range, if the above-mentioned internal angle is too large, a difficulty would arise in forming, in the upper surface of the head, lateral portions of a groove with which a screwdriver, for example, is engaged. If the above-mentioned internal angle is too small, the length of the head would be increased and the length of the threaded portion would be reduced. For that reason, the above-mentioned internal angle is preferably set to about 60° to 80°.

Example 2

Figure 4:
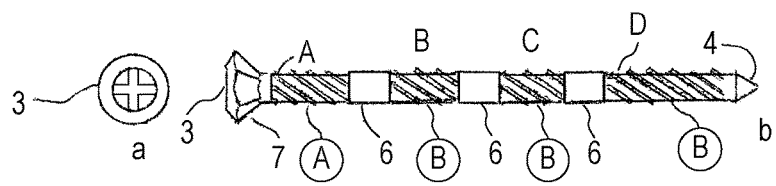
FIGS. 4(a) and 4(b) are respectively a plan view and a front view, each representing an embodiment different from the first embodiment.

FIG. 4 illustrates an embodiment slightly different from the above-described embodiment. In this embodiment, the threaded portion is divided into four parts, and the head has a circular outer outline in a plan view. The tip of the nail has a conical shape with an apex angle of 60° as in the above-described embodiment. Furthermore, the portion of the head on the back-surface side has a hexagonal pyramidal shape as in the case illustrated in FIG. 3.

In this embodiment, as illustrated in FIG. 4, the threaded portion is divided into four portions A, B, C and D, which are each in the form of a quadruple-thread screw. In the threaded portion A at the top, a lead angle is 42° and a lower-height thread ridge is formed at alternate threads of the quadruple-thread screw for volume adjustment. In the second threaded portion B, the third threaded portion C, and the fourth threaded portion D counting from the top, lead angles are all 45° and thread ridges have the same height.

Figure 5:
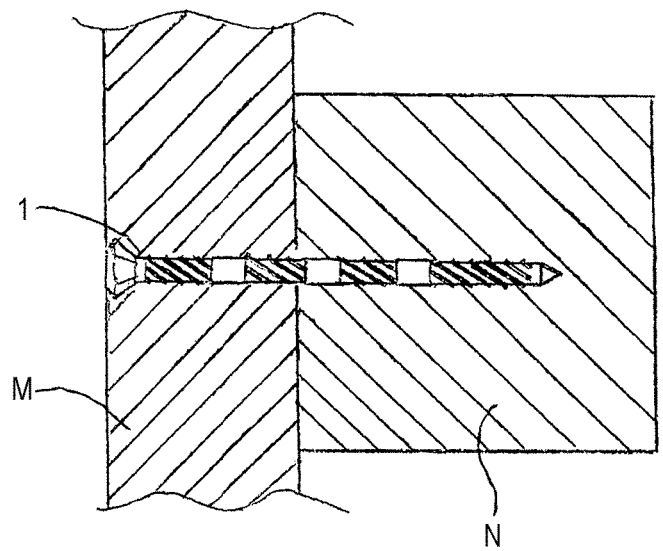
FIG. 5 is a sectional view representing a state where the impact-driven threaded nail is driven into wood materials for fixing them.
Figure 6:
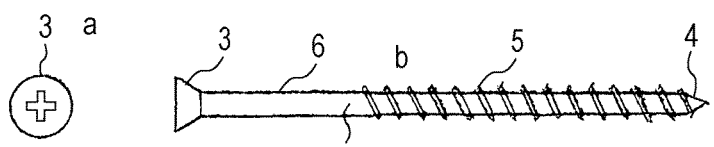
FIGS. 6(a) and 6(b) are respectively a plan view and a front view, each representing a screwing threaded nail (so-called coarse thread).

In use, the threaded nail according to this embodiment is driven into a material, such as a wood material, by employing a hammer or the like. When driven, the threaded nail is forced to thrust into the material while rotating about the shank axis. The driving of the threaded nail with a hammer or the like, is performed until the head is buried in the material. FIG. 5 illustrates a state where two wood materials are fixed to each other using the threaded nail according to this embodiment. An attached material M on the upper side is fixed to a stationary material N, such as a post, by employing the impact-driven threaded nail. In the illustrated fixed state, the nail is buried into the attached material M completely, i.e., up to the upper surface of the head.

In the above fixed state, even when external force acts on the nail in the direction to rotate it, the nail is not easily rotated because the nail head having the pyramidal shape is engaged with an inner surface of a hole that is formed in the attached material by the driving of the nail. As a result, both the materials are hard to loosen. In addition, since the shank includes the multiple unthreaded shank portions, a satisfactory effect can also be obtained against external force acting in a side direction of the threaded nail, i.e., in a shearing direction.

Example 3

Figure 9:
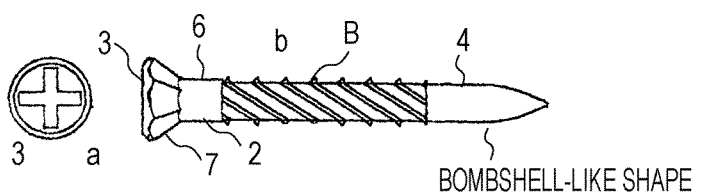
FIGS. 9(a) and 9(b) are respectively a plan view and a front view of a nail, which is dedicated for an underlying steel material, according to still another embodiment of the present invention.
Figure 10:
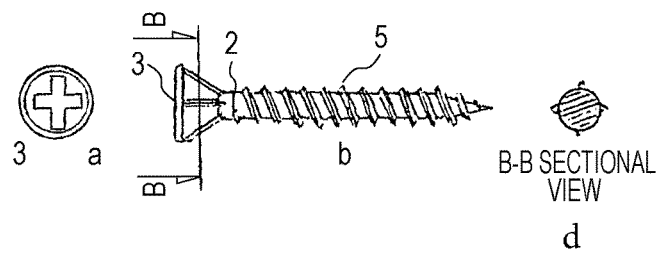
FIGS. 10(a), 10(b) and 10(d) are respectively a plan view, a front view, and a sectional view of a screwing threaded nail having a flexible head with ribs.

By modifying only the tip of the impact-driven threaded nail into a bombshell-like shape (see FIG. 9) that is optimum for being driven into a steel sheet or the like, the impact-driven threaded nail can be momentarily and firmly attached even to a steel-made underlying material, such as a C-type steel, instead of a woody underlying material, such as a wood material, with a nailing air gun capable of applying strong hitting force, insofar as the nail can be driven into the attached material. It is hence apparently possible to not only improve performance, but also greatly contribute to increasing work efficiency to a level much higher than that in attachment work in the past. The impact-driven threaded nail illustrated in FIG. 9 is used in the case where the attached material is a thin sheet with a thickness of 20 mm or less. Even in other cases, for example, where the attached material has a large thickness, similar advantageous effects to those obtained with the impact-driven threaded nail illustrated in FIG. 9 can be provided in use by modifying only the tip of each of the threaded nails, which have the shapes and the dimensions as illustrated in FIGS. 1 and 4, into a bombshell-like shape as described above.

Example 4

Figure 7:
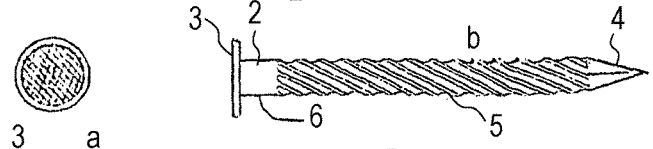
FIGS. 7(a) and 7(b) are respectively a plan view and a front view of a screw nail.
Figure 8:
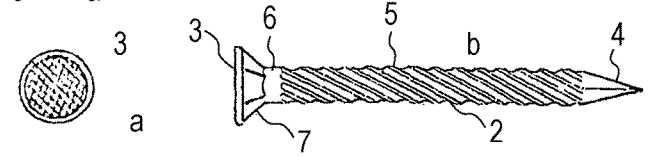
FIGS. 8(a) and 8(b) are respectively a plan view and a front view, each representing a screw nail in which a back-side surface of a head is formed into a regular hexagonal shape to prevent loosening of the nail.

While the above EXAMPLES provide the impact-driven threaded nails each having the thread with the lead angle of about 45°, FIG. 7 illustrates a threaded nail, generally called a screw nail, having a larger lead angle. The screw nail can be said as being one type of the so-called impact-driven threaded nail for the reason that, as mentioned above because helical ridges and grooves are formed along an outer circumference of a shank, the nail is driven into wood or the like in use, while the shank is caused to rotate, by hitting a head with a hammer, for example. However, because of having the larger lead angle, the screw nail has a problem that the nail is apt to loosen when large external force acts on the attached material in a direction to pull back the attached material from the underlying material. Aiming to solve such a problem, as in the above EXAMPLES 1 to 3, a portion of the head on the side nearer to the shank is formed in a pyramidal shape having a regular hexagonal cross-section with a diameter decreasing gradually toward the nail shank, whereby one type of impact-driven threaded nail, called the screw nail, having a high loosening preventive effect can be obtained. [See FIG. 8]

INDUSTRIAL APPLICABILITY

As is apparent from the above description, since the impact-driven threaded nail according to the present invention is harder to loosen than related-art various types of nails and threaded nails, it is possible to not only increase attachment strength, but also to carry out work in a manner of, as described above, successively driving and fixing many nails with the aid of an air gun, which is widely used for nailing, instead of employing a hammer or the like. Furthermore, when the impact-driven threaded nail according to the present invention is applied as in EXAMPLE 3, the modified screw nails can be momentarily driven and firmly fixed using the air gun. It is hence apparent that the impact-driven threaded nail according to the present invention exhibits very good characteristics and can be effectively used in various fields, such as wood working and building.

REFERENCE SIGNS LIST 1 impact-driven threaded nail
2 shank
3 head
4 tip
5 threaded portion
6 unthreaded shank portion
7 pyramidal portion on back-surface side of head (tapered portion)
A part of threaded portion 5 on head side
B part of threaded portion 5 other than A M attached material
N stationary material such as post
a plan view
b front view
c side view
d sectional view
α angle of sloping flank on head side in FIG. 2; 45°
β angle of sloping flank on tip side in FIG. 2; 15°
θ internal angle defining tapered portion of head on back-surface side; 70°

The invention claimed is:

1. An impact-driven threaded nail comprising:
a threaded portion with a lead angle of about 45°, the threaded portion being defined along an outer circumference of a nail shank that includes a first end defined as a pointed tip; and
a head having a larger diameter than the nail shank, the head being integrally provided at a second end of the nail shank, wherein
a tapered portion of the head on a back-surface side in continuation with the nail shank is defined in a pyramidal shape having a regular hexagonal cross-section with a diameter decreasing gradually toward the nail shank,
an internal angle (θ) of the tapered portion of the head is in a range of about 60° to about 80°, and
the threaded nail is configured to be impact-driven and rotate into a mounting member when impacted.

2. The impact-driven threaded nail according to claim 1, wherein an angle of the pointed tip is 60 degrees.

3. An impact-driven threaded nail comprising:
a threaded portion provided with ridges and grooves in multiple threads, the threaded portion being defined along an outer circumference of a nail shank that includes a first end defined as a pointed tip, and
a head having a larger diameter than the nail shank, the head being integrally provided at a second end of the nail shank, wherein
a tapered portion of the head on a back-surface side in continuation with the nail shank is defined in a pyramidal shape having a regular hexagonal cross-section with a diameter decreasing gradually toward the nail shank,
an internal angle (θ) the tapered portion of the head is in a range of about 60° to about 80°, and
the threaded nail is configured to be impact-driven and rotate into a mounting member when impacted.

4. The impact-driven threaded nail according to claim 3, wherein an angle of the pointed tip is 60 degrees.

* * * * *